(12) United States Patent  
Cirami

(10) Patent No.: US 7,508,445 B2
(45) Date of Patent: Mar. 24, 2009

(54) BINOCUCORDER

(76) Inventor: Salvatore Cirami, 12-21 35th Ave., Apt. 4F, Long Island City, NY (US) 11106-4729

( * ) Notice: Subject to any disclaimer, the term of this patent is extended or adjusted under 35 U.S.C. 154(b) by 647 days.

(21) Appl. No.: 10/771,932

(22) Filed: Feb. 5, 2004

(65) Prior Publication Data
US 2005/0174433 A1    Aug. 11, 2005

(51) Int. Cl.
*H04N 5/225*    (2006.01)
*H04N 13/00*    (2006.01)
*G02B 13/16*    (2006.01)
*G02B 23/08*    (2006.01)
*H04N 5/228*    (2006.01)

(52) U.S. Cl. .................. 348/375; 348/42; 348/335; 348/376; 359/404

(58) Field of Classification Search .............. 348/373, 348/377, 335, 36, 42, 207.99, 337, 375; 359/402, 359/404, 407, 409; 396/324, 424, 429; 353/7
See application file for complete search history.

(56) References Cited

U.S. PATENT DOCUMENTS 4,018,514 A * 4/1977 Plummer ................. 351/206
4,235,541 A * 11/1980 Jamel .................... 396/432
4,427,977 A * 1/1984 Carollo et al. ............ 345/22
5,239,411 A * 8/1993 Espie et al. .............. 359/362
5,270,751 A * 12/1993 Christian .................. 353/7
5,311,354 A * 5/1994 Kamiya et al. ........... 359/426
6,067,190 A * 5/2000 Kelly ..................... 359/407
6,377,398 B1 * 4/2002 Pieri et al. ............... 359/405
6,597,346 B1 * 7/2003 Havey et al. .............. 345/169

* cited by examiner

*Primary Examiner*—Ngoc-Yen T Vu
*Assistant Examiner*—Carramah J Quiett

(57) ABSTRACT

A camcorder mounted on a binocular includes a periscope that receives incident light on the effective line-of-sight of the binocular and reflects the light onto the line-of-sight of the camcorder into image processing elements of the camcorder, the camcorder being operable in telephoto mode and the binocular having a wide angle field of view, whereby the binocular serves as the target acquisition and maintenance of centering means for the camcorder, thereby enabling easiest acquisition of a target and enabling distant subjects of particular interest to be recorded in largest image without loss of sight of the target when the camcorder is operated in telephoto mode.

3 Claims, 2 Drawing Sheets

BINOCUCORDER

CROSS-REFERENCE TO RELATED APPLICATIONS

Disclosure Document No. 545758 filed Jan. 16, 2004.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

This invention relates to a device, herein termed a "binocucorder", which comprises a digital video camera (a "camcorder") of the recently introduced type which is substantially the size of a person's hand and which, in addition to a viewfinder, typically includes a Liquid Crystal Diode ("LCD") monitor incorporated in a door that swings open laterally from one side of the camcorder's housing, the camcorder being mounted on top of a binocular having a wide angle field of view; wherein the camcorder and binocular are cooperatively related such that the binocular operated in wide-angle mode normally serves as the target acquisition and centering means for the camcorder, as opposed to using the camcorder's viewfinder or LCD monitor for that purpose. The camcorder can thereby normally be operated in substantial telephoto mode with certainty of recording the target and without loss of a moving target, the optical superiority of the binocular being utilized to see and center on a target, particularly a distant target, and especially a nighttime target, even before it becomes visible in the viewfinder or LCD monitor of the camcorder.

Camcorders used to be bulky and were (and still are) provided with a viewfinder which is an eyepiece through which the user had to peer in order to view a small video screen on which the target was electronically displayed while being recorded on a videotape cassette. Difficulty locating a target, especially a distant target, in the small screen of the viewfinder even in the daytime let alone at night, led to the addition of the significantly larger LCD monitor which activates automatically when the door in which it is incorporated is swung open. Simultaneously with this improvement, camcorders which were so equipped were caused to operate digitally and were made much smaller and lighter in weight, and they have recently been reduced in size even further such that such camcorders can now fit in the palm of one's hand. Although the LCD monitor is a significant improvement, user's continue to find that acquisition and maintenance of the centering of a target in the LCD monitor is still difficult when the camcorder is operated in some degree of telephoto mode because the field of view is then significantly reduced. These limitations are especially noticeable when attempt is made to videotape a distant target at night. Typically, before the user can zoom the camcorder in on a target, he must first operate the camcorder in wide-angle mode in order to acquire the target and then zoom in on it once it is centered in the viewfinder or monitor. But the target, especially a moving target, is then easily lost due to the then existent narrower field of view, which requires going back to wide angle mode in order to reacquire the target. Obviously, the time taken to perform these operations reduces the time during which a moving subject can be recorded close up.

Many events, especially sporting events, are best enjoyed when one has the widest field of view. Each time the camcorder is operated into telephoto mode to "pull in" a subject of particular interest, that wide field of view is reduced, with corresponding loss of sight of what may be happening outside that reduced field of view. As a result, videotaping an event reduces the camcorder operator's enjoyment of the event as a whole.

The limited usefulness of the camcorder's viewfinder and even its LCD monitor becomes especially evident when the camcorder is used at night. It is frequently difficult, and sometimes impossible, for example, to identify an aircraft against a dark sky using either the viewfinder or the monitor. But such a subject is easily seen when using a binocular.

The invention enhances the ease with which a subject can be acquired, whether by day or by night, and kept centered for recording by a camcorder by mounting the camcorder on a binocular that is either fixed in wide angle field of view, or, is a zoom type binocular that is adjustable to a wide angle field of view, the binocular and the camcorder being cooperatively related such that both are always sighted on the same target, whereby the binocular may thereby normally be used as the target acquisition and centering means for the camcorder. The camcorder may thereby normally be operated in some degree of telephoto mode with certainty that the target is being recorded so long as the user maintains the target centered in the field of view of the binocular. Since the target will always be easier to see using the binocular, the user will always be assured that the target is in fact centered on the line-of-sight of the camcorder and its image is being recorded even if the target is not immediately visible in the viewfinder or monitor. This cooperative relationship greatly enhances the effectiveness of the camcorder.

It is further desired to provide such a device in such a compact size and light enough in weight that it can be conveniently hand-held, like a binocular when used alone. Accordingly, attainment of the results sought by the present improvement are dependent upon utilization of a camcorder that is of the smallest possible size. So-called "mini-camcorders" currently exist that are small enough to fit in the palm of one's hand. Such a combination (a "binocucorder") is conveniently hand-holdable, is as easy to carry about as is a binocular, and is as ready at all times for immediate use as is a binocular.

The user may then watch an event using only the binocular portion of his binocucorder, which is set in wide angle mode, enjoying the widest possible view of the event or easily acquiring a target, especially at night, while being assured that the camcorder, which has been set in a preferred telephoto mode, is positively recording a centered target of particular interest at close range. Daytime sporting events may thereby be enjoyed without interruption with a continuous wide angle view of the event, and nighttime subjects are quickly and easily acquired with certainty of positive centering of the subject in the field of view of the camcorder. While the LCD monitor may still be used for centering the target when the camcorder is used indoors where subjects are at extreme close range, at all other times is serves only as the means of monitoring the operating mode of the camcorder, and for viewing playback. Since the opened LCD monitor door is located immediately above the eyepieces of the binocular, only a slight upward glance is required whenever it is desired to check the operating configuration of the camcorder, such as confirming that the camcorder is in fact recording and not in pause mode, the degree of telephoto, the condition of the battery, etc.

The prior art is not known to disclose a miniature camcorder mounted on a binocular. The nearest prior art known appears to be a digital still photo camera incorporated in the body of a binocular between the tubular structures which house the optical elements of the binocular, and which has the capability of displaying on an included LCD monitor the last 30 seconds of what has been viewed through the binocular. A camcorder cannot be so located because said tubular structures would block opening of the LCD monitor, and also block opening of a second door which is located on the opposite side of the camcorder by means of which video cassettes are inserted into and removed from the camcorder.

BRIEF SUMMARY OF THE INVENTION

The object of the invention is to provide a camcorder mounted on top of a binocular that is either fixed in or is adjustable to a wide angle field of view; in such position thereon that the focus adjustment wheel and the zoom control lever, if any, of the binocular remain accessible for manual operation. Of course, the camcorder's line-of-sight will then be spaced well above the effective line-of-sight of the binocular, and therefore a subject centered in the binocular's field of view will not be centered in the camcorder's field of view unless measures are taken to compensate for that separation.

The invention provides a periscope which receives incident light on the binocular's effective line-of-sight and reflects it upwardly onto the camcorder's line-of-sight. Accordingly, it is an object of the invention to provide a camcorder having a housing a rearward portion of which houses the elements of the camcorder, including the LCD monitor, and a forward portion of which comprises a periscope that has its light-receiving end located centered between the objective lenses of the binocular, the periscope being proportioned narrow enough in width to fit therebetween. At any distance of the subject from the user, so long as the subject is centered in the field of view of the binocular it will necessarily be centered in the field of view of the camcorder.

BRIEF DESCRIPTION OF THE SEVERAL VIEWS OF THE DRAWING

FIG. 2 shows the camcorder's objective lens itself being used as the window through which incident light enters the periscope, the light being then reflected off the mirrors onto the remaining optics of the camcorder which form the final image.

DETAILED DESCRIPTION OF THE INVENTION

Figure 1:
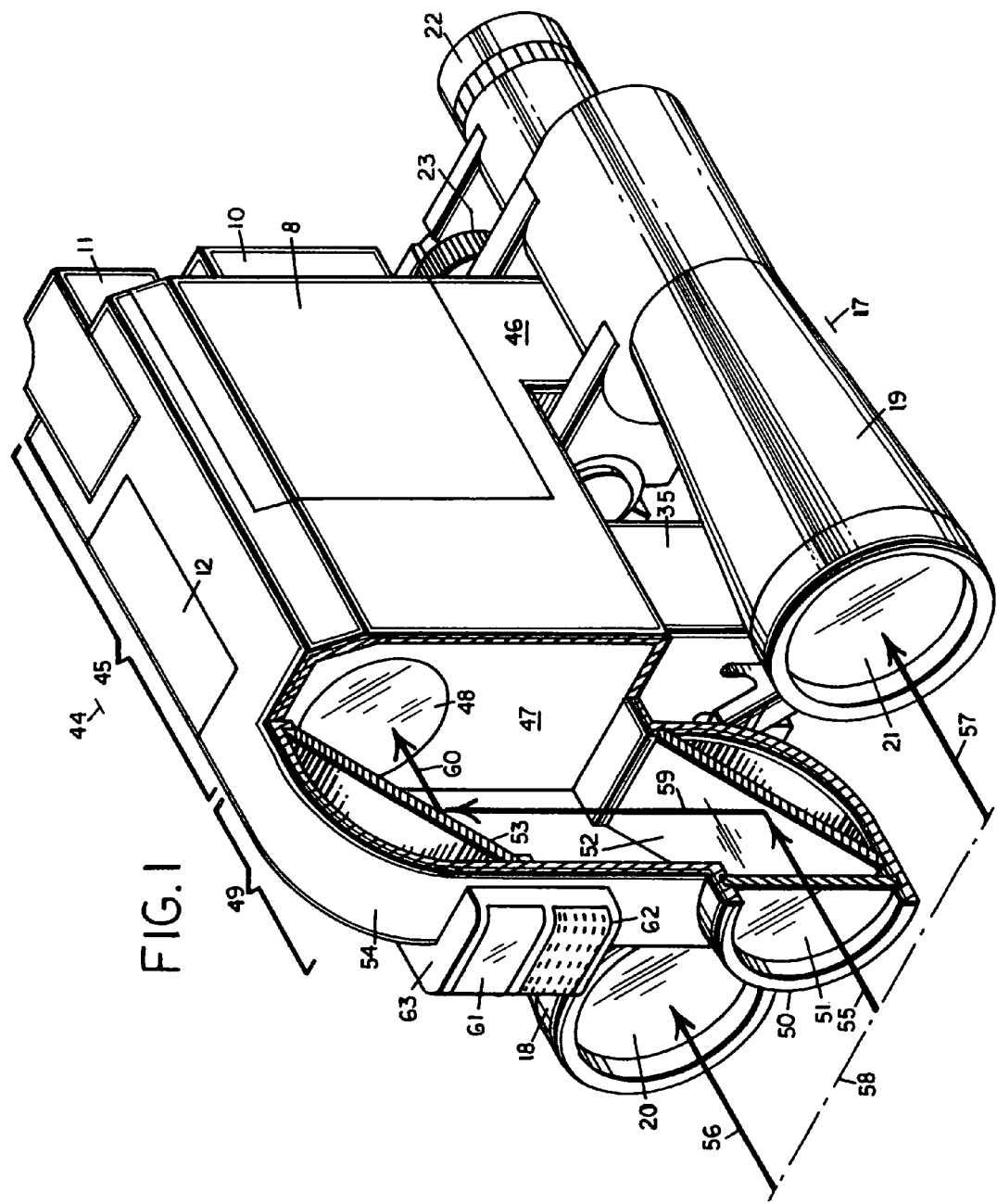
FIG. 1 is a general view in perspective of the invention showing a camcorder having a housing that has an underside portion formed for attachment of binocular elements, the housing having a forward portion forming a closed compartment containing periscope elements by means of which incident light is received by the camcorder, the periscope forward portion of the housing being shown in section to afford a view into its interior. In the FIG. 1 embodiment, the periscope uses first-surface mirrors and is provided with a plain glass window through which incident light enters the periscope, and the camcorder's objective lens is conventionally located in a forward wall of the camcorder's housing.

Referring to FIG. 1, a periscope is used as the means of causing the camcorder and the binocular to sight on a common target. A camcorder housing, indicated generally as 44, has a rearward portion 45 that contains the operative elements of the camcorder, including the LCD monitor 8 and the cassette door 12. The housing 44 is formed having an underside portion 46 to which the binocular body portions 18 and 19 are pivotally secured. The rearward or camcorder portion 45 of the housing 44 has a forward wall 47 which defines the forward end of the camcorder per se. The objective lens 48 of the camcorder 45 is conventionally mounted in the forward wall 47. The housing 44 has a forward portion 49 that extends forwardly of the camcorder's forward wall 47. The forward portion 49 together with the forward wall 47 form a dust-free compartment that is configured to define a periscope. The forward portion or periscope compartment 49 has a lower end portion 50 that is centered between the objective lenses 20 and 21 of the binocular, indicated generally as 17. The lower end portion 50 is provided with a window 51. A first first-surface mirror 52 is mounted in the lower end portion 50, and a second first-surface mirror 53 is mounted in the upper end portion 54 of the periscope compartment 49. Light processed by the camcorder arrives along the binocular's effective line-of-sight axis 55. Arrow 56 indicates the axis along which light is received centered in objective lens 20 of the binocular 17; and arrow 57 indicates the axis along which light is received in objective lens 21 of the binocular 17. The phantom line 58 indicates that the axis 55 is in the same plane as the axes 56 and 57; therefore any image centered in the field of view of the binocular 17 will necessarily be likewise centered in the field of view of the camcorder 45, and the distance of the subject will have no effect on that centering. The first first-surface mirror 52 is mounted at a 45 degree angle relative to the line-of-sight axis 55. The second first-surface mirror is mounted parallel to mirror 52. Incident light arriving along axis 55 and passing through the window 51 strikes the lower minor 52 which reflects the light 90 degrees upwardly along the path 59 whereby the light strikes the upper mirror 53 which reflects the light another 90 degrees onto the path 60 (the normal light-of-sight axis of the camcorder) into the objective lens 48 of the camcorder 45.

Conventionally, a camcorder includes a video light and a microphone, both of which are conventionally mounted at the forward end of the camcorder's housing. Since the periscope precludes such conventional location, a video light 61 and a microphone 62 are mounted on the periscope, incorporated in a structure 63 that extends from the front of the periscope compartment 49 to the camcorder 45 section of the housing 44, the structure 63 defining a channel on its unseen side through which channel the video light and the microphone are electrically connected to the circuitry of the camcorder. Other conventional elements include the camcorder's battery 10 and viewfinder 11, and the binocular's focus adjustment wheel 23 and eyepieces one of which is seen at 22.

Figure 2:
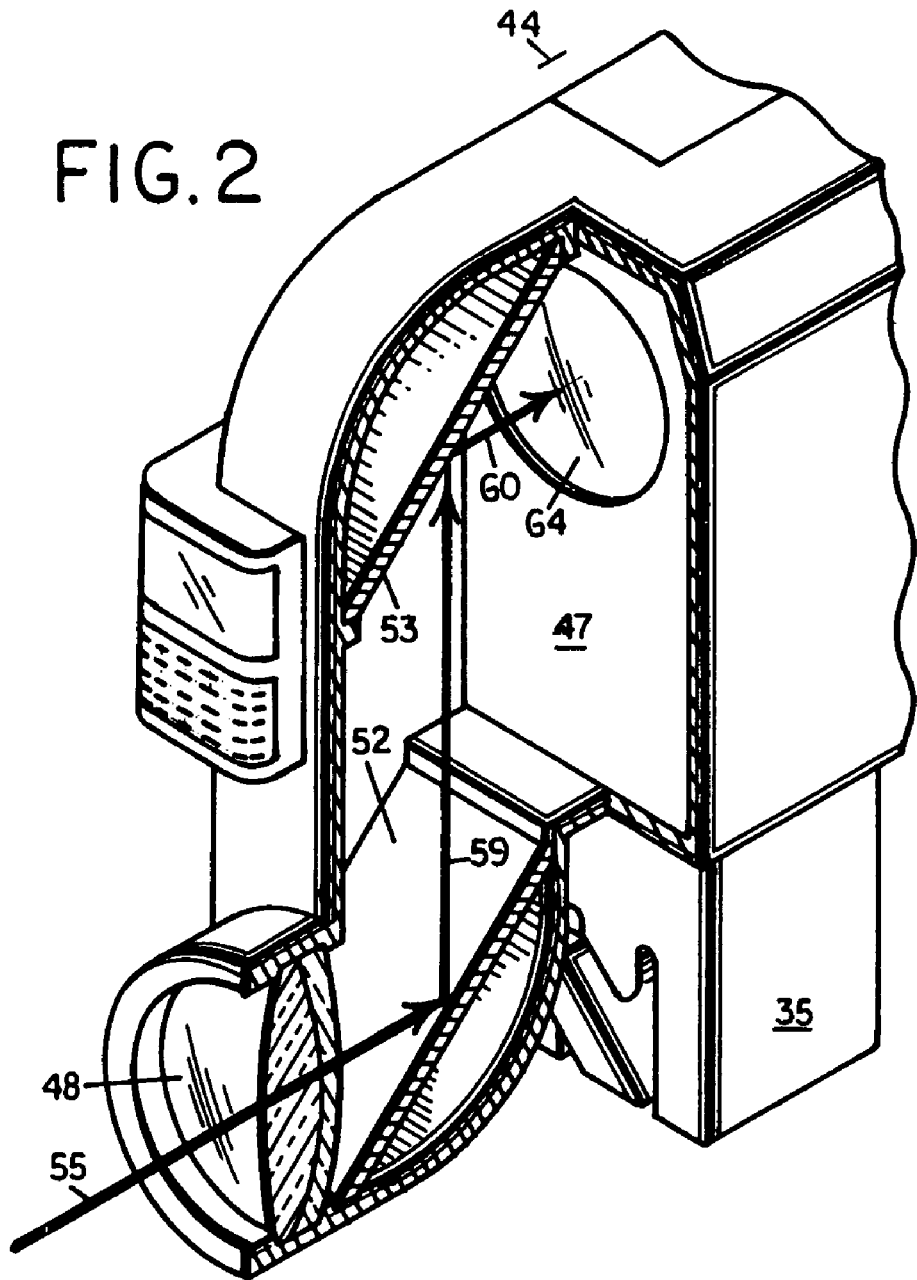
FIG. 2 is a perspective view similar to that of FIG. 1 but showing only the periscope section and a small portion of the camcorder section of the housing broken away from the remaining structure, the binocular not being shown at all but being understood to be identical to that shown in FIG. 1, the periscope portion being sectioned as in FIG. 1.

In FIG. 2 the camcorder's objective lens 48 has replaced the plain glass window 51 of the FIG. 1 embodiment, thereby reducing light loss. After passage through the objective lens 48 (which, as shown in FIG. 2, may comprise a subassembly of lenses), received light is reflected off the mirrors 52, 53, along the paths 59, 60, respectively, into the next lens 64 which is one of the series of lenses which conventionally comprise the optical system of the camcorder and which process the received light into a final image. It is to be understood that FIG. 2 illustrates only the principle of the arrangement and not necessarily the actual configuration of the objective lens 48. In FIGS. 1 and 2, the structure indicated at 35 is a square tube that is fixed to and is dependent from the underside of the camcorder's housing. The square tube 35 is a suggested means of securing the illustrated embodiments on a tripod (not shown) having a square post (not shown) at its upper end onto which the square tube is slidably received for a jammed fit thereon. The square tube 35 is not an essential feature and is not a part of the invention as claimed.

I claim:

1. A binocucorder, comprising:
    a camcorder including image processing elements and a line-of-sight;
    an optical binocular including first and second tubular body portions having corresponding rearward portions which are secured together and having corresponding forward portions which are spaced apart parallel to each other so that a space exists between said corresponding forward portions of said binocular, each of said corresponding forward portions of said binocular having a forward end incorporating an objective lens, said binocular having an effective line-of-sight that is centered between said objective lenses parallel to said corresponding forward portions, said camcorder being mounted on said binocular; and,
    periscope means mounted on said camcorder having a lower end portion that is located in said space between said corresponding forward portions of said binocular, said lower end portion of said periscope means having a window through which incident light is received on said binocular effective line-of-sight, said periscope means directing said received light onto said camcorder line-of-sight into said image processing elements of said camcorder.

2. The binocucorder according to claim 1: said camcorder having a housing having a forward portion defining a closed periscope compartment containing said periscope means, a rearward portion containing said image processing elements and an underside portion dependent from said rearward portion, said corresponding rearward portions of said first and second tubular body portions being attached to said underside portion of said camcorder housing, said periscope compartment including said window for entry of said incident light into said periscope compartment, said periscope compartment being structured to permit passage of said light to said image processing elements of said camcorder.

3. The binocucorder according to claim 2: said image processing elements of said camcorder including an objective lens, said window being said objective lens of said camcorder.

* * * * *